United States Patent [19]

Cain et al.

[11] Patent Number: 5,958,476
[45] Date of Patent: Sep. 28, 1999

[54] FROZEN OR CHILLED CONFECTIONERY PRODUCTS

[75] Inventors: Frederick William Cain; Helga Gerda A. Manson née van der Struik, both of Wormerveer; Jeroen Nicolaas M. van Straalen, Wognum, all of Netherlands

[73] Assignee: Unilever Patent Holdings B.V., Vlaardingen, Netherlands

[21] Appl. No.: 08/983,453

[22] PCT Filed: Jun. 5, 1996

[86] PCT No.: PCT/EP96/02471

§ 371 Date: Jul. 29, 1998

§ 102(e) Date: Jul. 29, 1998

[87] PCT Pub. No.: WO97/02754

PCT Pub. Date: Jan. 30, 1997

[30] Foreign Application Priority Data

Jul. 13, 1995 [EP] European Pat. Off. .............. 95201928

[51] Int. Cl.$^6$ ....................................................... A23G 3/00
[52] U.S. Cl. ......................... 426/68; 426/565; 426/566; 426/567; 426/601; 426/602; 426/613; 516/54

[58] Field of Search ............................... 426/68, 565, 566, 426/567, 601, 602, 613; 252/351, 358; 516/54

[56] References Cited

U.S. PATENT DOCUMENTS

| | | | |
|---|---|---|---|
| 5,248,509 | 9/1993 | Bruin | 426/72 |
| 5,308,639 | 5/1994 | Fung | 426/602 |
| 5,731,027 | 3/1998 | Cain et al. | 426/607 |

FOREIGN PATENT DOCUMENTS

| | | |
|---|---|---|
| 345 075 | 12/1989 | European Pat. Off. . |
| 354 600 | 2/1990 | European Pat. Off. . |
| 397 247 | 11/1990 | European Pat. Off. . |
| 547 658 | 6/1993 | European Pat. Off. . |

*Primary Examiner*—Nina Bhat
*Attorney, Agent, or Firm*—Pillsbury, Madison & Sutro, LLP

[57] ABSTRACT

Frozen or chilled confectionery products, in particular ice-creams, with a unique taste performance comprising a fat-continuous or bicontinuous or duplex fat-emulsion comprising 5–50 wt % fat, 5–60 wt % water, 5–80 wt % thickener, sweetener and/or humectant, the emulsion being present as a coating layer, a barrier layer or as an inclusion.

17 Claims, No Drawings

FROZEN OR CHILLED CONFECTIONERY PRODUCTS

This is a 371 National Stage application of PCT/EP96/02471, filed Jun. 5, 1996 and claims the benefit thereof.

Frozen and chilled confectionery products, such as ice-creams, ice-pralines, chilled custard, tarts, desserts etc. are known for quite some time. It is also known to apply these products, provided with a coating layer (e.g. a chocolate-coating on ice-creams), or with a separate product-layer (e.g. layered ice-creams, wherein the composition of the different layers is different), or with a barrier-layer (e.g. ice-creams in waffles or in cones are provided with a barrier layer), or with inclusions (cf e.g. our copending Eur. Pat. Applic. 94203673.2).

Although many of above products have a good taste and a good performance, it was also noticed that still a rather limited range in taste, shape and texture performance was possible, using prior art techniques. Therefore we performed a study in order to find out, whether we could extend the existing range of products and/or whether we could find novel products with a unique taste-performance in this area.

Above study resulted in the finding of novel and unique products. Our invention concerns the use of known and novel fat-emulsions for a completely different purpose.

From EP 345.075 gelled duplex emulsions are known, that comprise 0.1–40% of a gelled external continuous waterphase; an oil or fat phase, dispersed in the external aqueous phase, while an aqueous phase, containing an osmotic pressure component is present, dispersed in the oil or fat phase. Gelling agents that can be used are gelatin, meat, egg and fish proteins, polysaccharides and inorganic materials such as clays.

The osmotic pressure component can be selected from sodium chloride, and a number of sugars, including glucose, sucrose and malto-dextrins.

The emulsion can be applied in foods such as creams. Nothing is disclosed about the use of these emulsions as coating layer, or as barrier layer, or as inclusion in frozen or chilled confectionery products.

From EP 547658 and WO 95/00830 (appl.nr) fat-emulsions are known that comprise a continuous fat-phase, representing 5–50 wt. % of the emulsion and a water-phase, comprising water and another component, which other component is mainly selected from thickeners, sweeteners and humectants, while also acidity regulators, bulking agents, emulsifiers, flavours, colorants and preservatives can be present.

The emulsions can be used for confectionery purposes in the form of encapsulated filling materials or for spreads. The properties of encapsulated fillings were good at temperatures of 10–20° C.

However nothing is mentioned about a use of these emulsions in frozen or chilled confectionery products for the purposes we claim. We found unexpectedly that these emulsions have properties, which make them very suitable for applications at low temperatures. So we found, that application of those emulsions in frozen confectionery products, such as ice-creams led to products with a unique and novel taste performance. This is the more unexpected, realising that ice-cream itself is a water-continuous fat-emulsion, the fact that the combination of our fat-continuous, bicontinuous or duplex fat-emulsions, with a water continuous fat-emulsion at low (chilled: so at about 5–6° C.) or at very low (frozen: so at about −18 to −20° C.) temperatures would lead to a compatible system of fat-emulsions with an unique taste performance was unexpected.

Therefore our invention concerns frozen or chilled confectionery products, containing at least a fat-composition, wherein the confectionery products are provided with an amount of a fat-continuous, or bicontinuous or duplex fat-emulsion, which fat-emulsion comprises:

- 5–50 wt. %, preferably 15–40 wt. %, most preferably 20–30 wt. % fat
- 5–60 wt. %, preferably 10–40 wt. %, most preferably 15–30 wt. % water
- 5–80 wt. %, preferably 20–70 wt. %, most preferably 40–65 wt. % of a thickener, and/or sweetener and/or humectant, while simultaneously effective small amount of acidity regulator(s), bulking agent(s), emulsifier(s), flavour(s), colorant(s) and/or preservative(s) can be present, which fat-emulsion is present in and/or on the confectionery products:
  - as, coating layer and/or
  - as, product layer in a multi-layered product and/or
  - as, barrier layer and/or
  - as, inclusion, which inclusion can be encapsulated in a food-acceptable encapsulation.

Optimal results are obtained when the fat-emulsion has a specific Stevens-hardness-profile. Stevens hardness can be measured, using a Stevens Texture Analyzer with a probe of 45°, a penetration rate of 0.5 mm/sec. and a penetration depth of 2 mm.

Before measuring the Stevens hardness (C) the emulsion is kept at measurement temperatures for 24 hours.

We found that optimal results were obtained, when the ratio between Stevens hardness at −20° C. to Stevens hardness at $$\frac{C-20°\,C.}{C+20°\,C.}$$

is less than 20, preferably less than 10, most preferably less than 5.

It was further found that very unique taste properties were achieved, when the fat-emulsion contains such an amount of (thickener+sweetener) that the weight-ratio $$\frac{\text{thickener} + \text{sweetener}}{\text{water}}$$

in the emulsion is more than 1.5, preferably 2–9.

Although our invention is not limited in the type of fat that can be applied for the preparation of our emulsions, we prefer to use fats selected from the group, consisting of: cocoa butter, illipe, shea, palm, sal, soybean, cottonseed, palmkernel, coconut, rapeseed and sunflower oil, or fractions, or blends thereof.

The fats preferably display an NMR-SFI profile (NMR-pulse, stab) of $N_5=10–95$; $N_{20}=10–90$; $N_{35}<5$. The most suitable fats display a ratio between $N_{25}$ (stab): $N_{25}$ (unstab) >1.5, preferably >3, wherein $N_{25}$ is the solid fat index (NMR-pulse) at 25° C.

The N-values of the fats are measured according to a standard pulse, NMR-technique. The N-values of the fats are measured both without and after stabilization. Unstabilized means that the N-value is measured after the following regime: melt at 80° C.; 30 minutes at 60° C.; 1 hour at 0° C.; 30 minutes at measurement temperature 25° C. Stabilized fats were measured after: melt at 80° C.; 15 minutes at 60° C.; 60 minutes at 0° C.; 16 hours at 26° C.; 24 hours at 20° C.; 60 minutes at 0° C.; 60 minutes at measurement temperature 25° C. (or other measurement temperature).

The thickeners, that can be applied are selected from the group consisting of:
proteins, such as: gelatin, hydrolysed gelatin, casein, caseinates, vegetable proteins and denatured proteins
carbohydrates, such as: potato starch, corn starch, maize starch, tapioca starch, xanthan gum, the different carrageenan gums, pectin, agar, the maltodextrins, polydextrose, hydrolyzed starches and modified starches.

Sweeteners are another group of important ingredients that provide the possibility of regulating the caloric intake of the emulsions. Suitable sweeteners are sucrose, lactose, maltose, galactose, fructose, glucose, but also high-intensity sweeteners, such as aspartame, saccharin, acesulfame-K, sucralose or alitame can be used. The preferred amount of sweeteners is 0.005–60 wt. %, while this amount is only 0.005–10 wt. % when a high-intensity sweetener is used.

The use of a humectant also provides the possibility of regulating the caloric intake and the other properties of the filling composition. Very suitable humectants are glycerol and hygroscopic, food-grade, inorganic or organic salts. The humectants are preferably present in amounts of 0–70 wt. % in particular 15–40 wt. %, of the remainder.

Other components that can be present in the emulsions are flavours, colourants and preservatives. The preservatives are preferably present in amounts of 0.005–4 wt. % and are suitably selected from sorbate salts, benzoate salts, ascorbic acid, urea or its derivatives.

The above-mentioned components are used in such amounts, within the ranges mentioned above, that a filling composition is obtained that is microbiologically and structurally stable at ambient temperature for at least 4 weeks, perferably for more than 12 weeks.

Emulsifiers can also be present in the compositions. These emulsifiers can be any known emulsifier, but are suitably chosen from the monoglycerides, such as hymonos (Quest International), lecithins, DATA esters (=diacetyl tartaric acid esters), lactodans (=glycerol lactic esters) or mixtures thereof. The amount of emulsifier is 0.1–2 wt. %, preferably 0.2–1.5 wt. %.

The fat-emulsions can also be applied in aerated form. Suitable overruns for this purpose range from 1–35%.

The fat emulsions can be made by the techniques disclosed in our earlier European patent applications EP 547 658 and PCT/EP95/00830.

Therefore these techniques are considered to be part of this specification by way of reference. In particular the process according to PCT/EP95/00830 leads to products with an excellent taste performance.

Our frozen or chilled confectionery products are made by a process, comprising the steps of:
making of a fat-continuous or bicontinuous fat-emulsion with the composition, as mentioned earlier, using a votator
if necessary liquifying the emulsion by heating of the emulsion
providing a frozen or chilled confectionery product with:
(i) a coating layer and/or
(ii) a barrier layer and/or
(iii) an inclusion made from the emulsion This process results in fat-continuous or bicontinuous fat-emulsions, due to the use of the votator. If duplex-emulsions are required (definitions of the different emulsion-types can be found on p.4, l. 9–12 of EP 547.658), the process to be carried out is as follows:
making a duplex emulsion with the compositions as mentioned earlier, by making a fat-continuous or water-continuous fat emulsion, followed by dispersion of the emulsion formed in the non-continuous component of the emulsion
if necessary liquifying of the emulsion formed by heating
providing a frozen or chilled confectionery product with
(i) a coating layer and/or
(ii) a barrier layer and/or
(iii) an inclusion, made from the emulsion.

However, other process-routes are possible as well. E.g it is possible to apply extrusion or enrobing techniques well known in the ice-cream area. Moreover, the application of cutting-techniques of frozen emulsions is possible as well.

Our invention further relates to the use of a fat-continuous or bi-continuous or duplex fat emulsion in frozen or chilled confectionery products: wherein an emulsion with the composition as mentioned earlier, is used in a frozen or chilled confectionery products as
(i) coating layer and/or
(ii) barrier layer and/or
(iii) inclusion in order to provide the frozen or chilled product with an unique combination of taste-performance, shape and texture.

Ice-creams (as the most typical example of frozen confectionery products), and chilled confectionery products, provided with a barrier, filling or coating, comprising the fat-emulsions disclosed above are also part of the invention.

| | Preparation of fat-emulsions | |
|---|---|---|
| I.1 | The following recipe was applied: | |

| Ingredient | wt % |
|---|---|
| fat A | 24.2 |
| emulsifier (=monoglyceride) | 0.8 |
| flavour | 0.3 |
| sweetose (=glucose syrup: 18% water) | 69.7 |
| K-sorbate | 0.1 |
| lactic acid | 0.05 |
| colourant | 0.05 |
| water | up to 100% |
| fat A, consisted of 70% palm oil mid + 30% palm oil olein | |

| | | |
|---|---|---|
| I.2 | A premix was made from the aqueous and fat phases at 65° C. The premix was pumped at 50 g/min through two A-units. The conditions applied were as follows: | |

| | $A_1$ | $A_2$ |
|---|---|---|
| rotator speed (rpm) | 1300 | 1300 |
| exit temp. | 17° C. | 12° C. |

This product is fat-emulsion I. Stevens-hardness-ratio $^{C-20}/_{C+20}$ = 8.7.

| II.1 | Another fat-emulsion was made using the following recipe: | |

| Ingredient | wt % |
|---|---|
| fat B | 19.4 |
| emulsifier (Myverol$^R$) | 0.6 |
| flavour | 0.3 |
| High fructose corn syrup (syrup: 19% water) | 38.7 |
| Litesse-2 ® (=polydextrose) | 34.0 |
| K-sorbate | 0.1 |
| citric acid | 0.04 |
| colourant | 0.3 |
| water | up to 100% |

-continued

| Preparation of fat-emulsions | |
|---|---|
| | fat B, consisted of 70% palm oil mid + 30% palm oil olein |
| II.2 | A premix was made at 65° C. the throuh-put was 3.9 kg/hr. Two A-units were applied, using the following conditions: |

| | $A_1$ | $A_2$ |
|---|---|---|
| rotator speed (rpm) | 1600 | 1200 |
| exit temp. | 18.9 | 15.1 |

| | |
|---|---|
| | The product is fat-emulsion II. Stevens-hardness ratio $^{C-20}/_{C+20}$ = 5.3. |
| III | Preparation of coated ice-creams |
| III.1 | Emulsion I was liquified by careful warming up to 35–40° C. Ice-creams were dipped into the liquid emulsions. After drying the products were stored at −18° C. |
| III.2 | A comparison was made with a commercial coating-layer based on coconut fat. (=CN) The following data were obtained: |

| Sample | drip-time (sec) | dry-time (sec) |
|---|---|---|
| CN | 9 | 53 |
| emulsion -I | 5 | <60 |

| | |
|---|---|
| III.3 | So drip-time and dry-time are similar to those of a commercial product. However the taste was completely different. The use of our fat-emulsion led to products, having a unique taste and flavour profile |
| IV | Ice-pralines |
| IV.1 | A coating was made using the following recipe: |

| Ingredient | wt % |
|---|---|
| cacao-powder N11N | 14 |
| SMP | 7 |
| fat | 31 |
| fine sugar | 48 |
| lecithine | 0.4 |

| | |
|---|---|
| | The fat was a 74:26 mix of a palm-mid fraction and a mid fraction of interesterified palm oil. It contained 18% SSO-triglycerides. The coating was melted at 40° C. A mold was filled on a vibrating table (to avoid incorporation of air). The mold was hardened for 15 min. at 13° C. |
| IV.2 | Emulsion I was liquified and the molded products obtained in IV.1 were filled with the liquid emulsion. The products were backed off with the coating and solidified at 13°0 C. during 30 min. In order to be able to remove the product from the mold the products were cooled to 7° C. for 5 min. |
| IV.3 | The products were dispersed in ice-cream and resulted in a composite-product with excellent taste performance at about −10° C. |
| V | Layered ice-creams Emulsion I and ice-creams were cut, so that layers of each were obtained having the dimension of 2 × 4 × 0.5 cm. A layer of emulsion was sandwiched between two layers of ice-cream. The sandwich was frozen to −18° C. and enrobed with a coconut oil based coating with a temperature of 30° C. The coconut based coating had the following composition: |

-continued

| Preparation of fat-emulsions | |
|---|---|
| Ingredient | wt % |
| coconut oil | 59.2 |
| sugar | 25.8 |
| cacao powder NIIN | 13.0 |
| SMP | 1.7 |
| lecithins | 0.3 |

The products obtained displayed a unique taste-performance.

We claim:

1. A frozen or chilled confectionery product, containing at least a fat-composition, wherein the confectionery products are provided with an amount of a fat-continuous, or bicontinuous or duplex fat-emulsion, said fat-emulsion displaying a stevens hardness-profile (measured after 24 hours at the temperatures indicated) such that (C−20° C.)/(C+20° C.) is less than 20, said emulsion comprising:
   5–50 wt. % fat
   5–60 wt. % water
   5–80 wt. % of a member selected from the group consisting of a thickener, sweetener and humectant; optionally with an effective small amount of one or more components selected from the group consisting of acidity regulator, bulking agent, emulsifier, flavour, colorant and preservative; said fat-emulsion being present as at least one part of the confectionery product selected from the group consisting of:
   a coating layer;
   a product layer in a multi-layered product;
   a barrier layer and an
   inclusion, said inclusion being optionally encapsulated in a food-acceptable encapsulation.

2. A frozen or chilled confectionery product, according to claim 1, wherein the fat-emulsion displays a stevens hardness-profile (measured after 24 hours at the temperatures indicated), such that C−20° C./C+20° C. is <10.

3. A frozen or chilled confectionery product according to claim 2 wherein the C−20° C./C+20° C. is <5.

4. A frozen or chilled confectionery product, according to claim 1, wherein the fat-emulsion contains such an amount of (thickener+sweetener) that the weight-ratio thickener+sweetener/water in the emulsion is more than 1.5.

5. A frozen or confectioner product according to claim 4 wherein the weight ratio thickener+sweetener/water is in the range of 2–9.

6. A frozen or chilled confectionery product according to claim 1 wherein the fat-emulsion comprises a fat selected from the group consisting of: cocoa butter, illipe, shea, palm, sal, soybean, cottonseed, palmkernel, coconut, rapeseed and sunflower oil, fractions, and blends thereof.

7. A frozen chilled confectionery product according to claim 6, wherein the fat displays a ratio between $N_{25}$ (stab): $N_{25}$ (unstab)>1. 5, wherein $N_{25}$ is the solid fat index (NMR-pulse) at 25° C.

8. A frozen or chilled confectionery product according to claim 7 wherein the fat displays a ratio between $N_{25}$ (stab): $N_{25}$ (unstab) of >3.

9. A frozen or chilled confectionery product according to claim 1, wherein the fat-emulsion comprises a thickener selected from the group consisting of:
   gelatin, hydrolysed gelatin, casein, caseinates, vegetable proteins, denatured proteins
   potato starch, corn starch, maize starch, tapioca starch, xanthan gum, pectin, agar, carrageenan gum, polydextrose, maltodextrins, hydrolysed starch and modified starch.

10. A frozen or chilled confectionery product according to claim 1, wherein the fat-emulsion comprises a sweetener selected from the group consisting of maltose, galactose, lactose, sucrose, fructose, glucose and high intensity sweeteners.

11. A frozen or chilled confectionery product according to claim 1, wherein the fat-emulsion is aerated.

12. A frozen confectionery product according to claim 1, wherein the product is ice-cream.

13. Process for the preparation of frozen or chilled confectionery products, comprising the steps of:

making a duplex emulsion comprising 5–50 wt % fat; 5–60 wt % water; and 5–80 wt % of at least one member of the group consisting of a thickener, a sweetener and a humectant, in claim 1, by making a fat-continuous or water-continuous fat emulsion, followed by dispersion of the emulsion formed in the non-continuous component of the emulsion;

optionally liquifying the emulsion thus formed by heating; and providing a frozen or chilled confectionery product with at least one part selected from the group consisting of
   a coating layer,
   a barrier layer and
   an inclusion, made from the emulsion.

14. Chilled confectionery products, provided with a filling, barrier or coating comprising a fat-emulsion as described in claim 1.

15. A frozen or chilled confectionery product according to claim 1 wherein the fat emulsion comprises 15–40 wt % fat; 10–40 wt % water; and 20–70 wt % of said member.

16. Process for the preparation of frozen or chilled confectionery products, comprising the steps of:

making a fat-continuous or bicontinuous fat-emulsion comprising 5–50 wt % fat; 5–60 wt % water; and 5–80 wt % of at least one member selected from the group consisting of a thickener, a sweetener and a humectant, using a votator;

optionally liquifying the emulsion by heating of the emulsion; and providing a frozen or chilled confectionery product with at least one part selected from the group consisting of
   a coating layer,
   a barrier layer and
   an inclusion, made from the emulsion.

17. The method which comprises providing a frozen or chilled confectionery product with at least one part selected from the group consisting of a coating layer, a barrier layer and an inclusion comprising a fat-continuous or bicontinuous fat emulsion comprising 5–50 wt % fat; 5–60 wt % water; and 5–80 wt % of at least one member selected from the group consisting of a thickener, a sweetener and a humectant, said emulsion providing said product with a combination of taste-performance, shape and texture.

* * * * *